Dec. 2, 1947.  W. B. DEAN  2,431,864
DRAWBAR CARRIER FOR RAILROAD CAR COUPLING MECHANISM
Filed Jan. 17, 1945  3 Sheets-Sheet 1

INVENTOR
Walter B. Dean.
BY John P. Tarbox
ATTORNEY

Dec. 2, 1947. W. B. DEAN 2,431,864
DRAWBAR CARRIER FOR RAILROAD CAR COUPLING MECHANISM
Filed Jan. 17, 1945 3 Sheets-Sheet 2

INVENTOR
Walter B. Dean
BY John P. Tarbox
ATTORNEY

Dec. 2, 1947.   W. B. DEAN   2,431,864
DRAWBAR CARRIER FOR RAILROAD CAR COUPLING MECHANISM
Filed Jan. 17, 1945   3 Sheets-Sheet 3
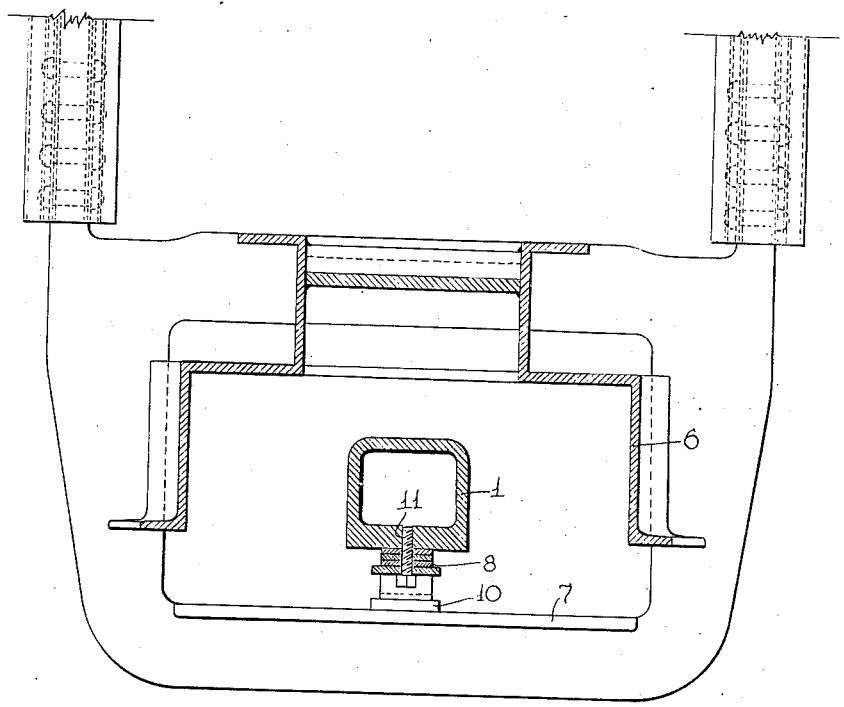
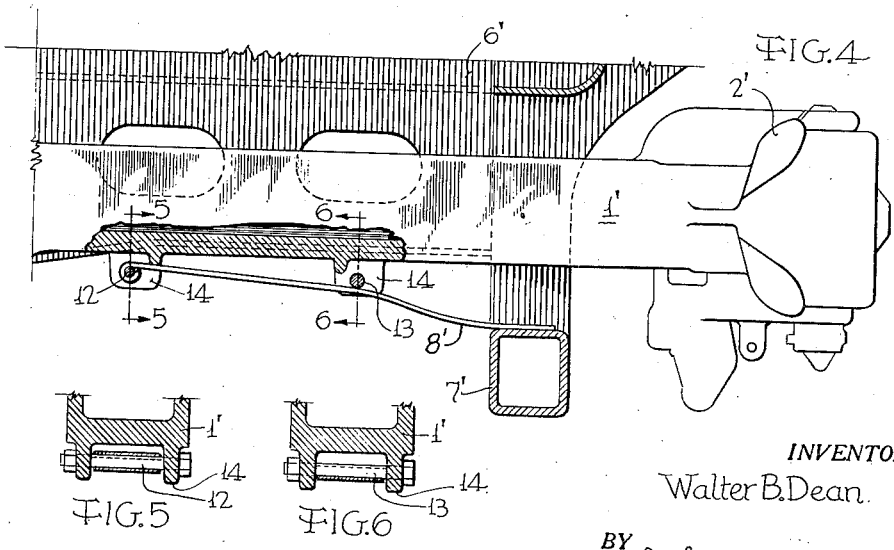
INVENTOR
Walter B. Dean.
BY John P. Tarbox
ATTORNEY Patented Dec. 2, 1947

2,431,864

UNITED STATES PATENT OFFICE 2,431,864

DRAWBAR CARRIER FOR RAILROAD CAR COUPLING MECHANISM

Walter B. Dean, Narberth, Pa., assignor to The Budd Company, Philadelphia, Pa., a corporation of Pennsylvania Application January 17, 1945, Serial No. 573,177

2 Claims. (Cl. 213—61)

This invention relates to car couplers, particularly to coupler head supporting means, and has for an object the provision of improvements in this art.

One of the particular objects of the invention is to provide a construction which will resiliently support the coupler member in any position it may assume.

Another object is to provide simple, light, durable, and easily serviced mechanism for supporting the coupler member, the mechanism also being free from the complicated guides and retainers required by coil spring supports.

The above and other objects of the invention will be apparent from the following description of an exemplary embodiment, reference being made to the accompanying drawings, wherein:

Figure 3 is a vertical transverse section taken on the line 3—3 of Figure 2;

Figure 4 is a vertical longitudinal section of a modification;

Figure 5 is a partial transverse vertical section taken on the line 5—5 of Figure 4; and Figure 6 is a partial transverse vertical section taken on the line 6—6 of Figure 4.

Figure 1:
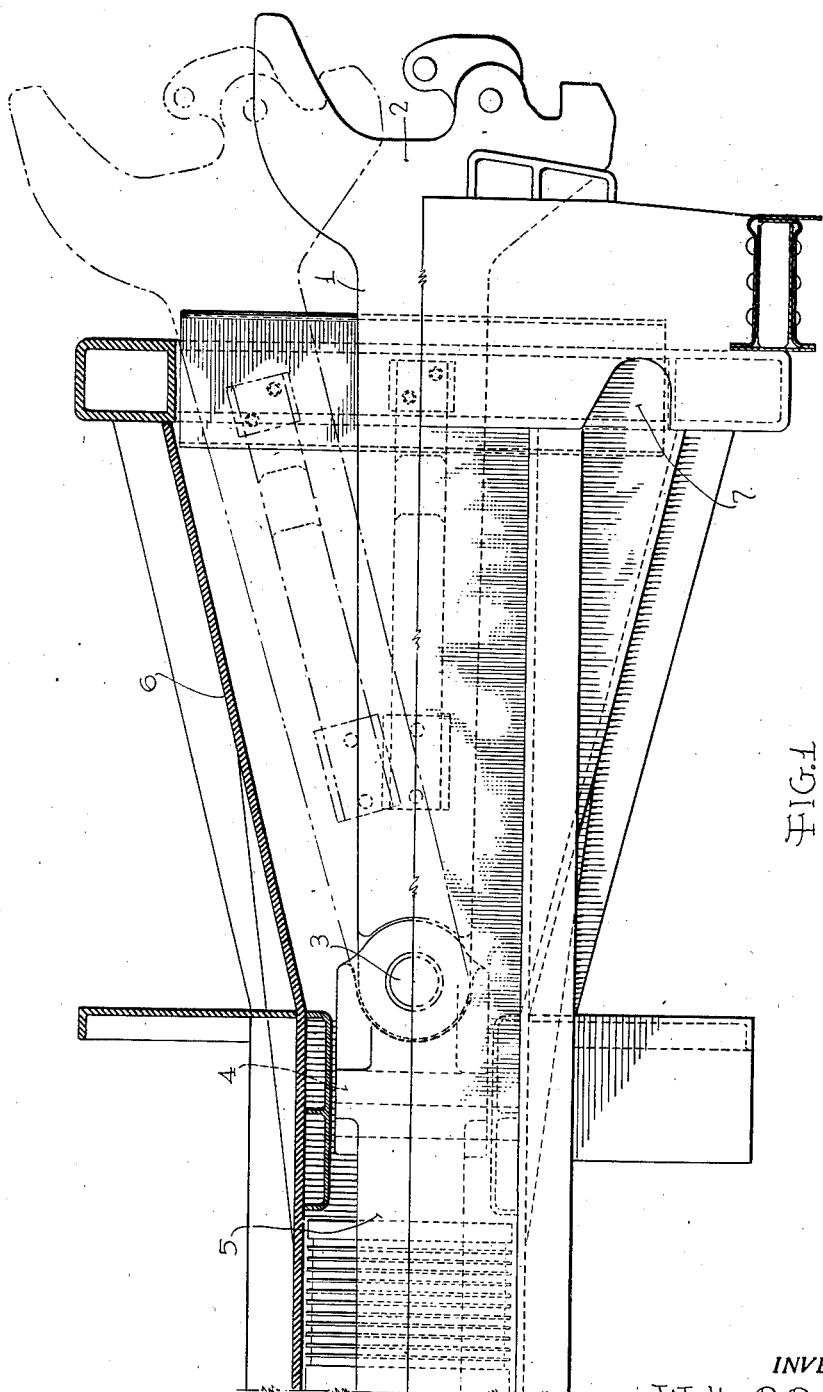
Figure 1 is a plan section of a car coupler construction embodying the invention.

The invention is particularly applicable to tight lock couplers wherein one head is not free to slide vertically relative to the companion head and wherein resilient supporting means for each head is desirable. The required vertical deflection of the head may be as much as three inches and the spring supporting means should be able to balance the weight of the coupler member throughout this range of movement.

A number of arrangements have been used or proposed in the past but each has had inherent disadvantages. One arrangement included rubber supports and this worked well until the rubber lost its resiliency but thereafter was not effective. Another arrangement included coil springs with retainers and guides but this was complicated and noisy.

The present invention provides a resilient leaf member which is anchored to the coupling member and the free end of which slides transversely on the lower rail of a coupler carrier.

In the illustrated embodiment a coupling member 1, which includes a coupling head 2, is mounted for horizontal swinging movement on a pin 3 and for vertical swinging movement on a pin 4 carried by a yoke 5. The coupler carrier 6 provides a lower rail or sill 7 for supporting the coupling member.

The shank of the coupler member 1 has secured on the lower side thereof a resilient member 8, here in the form of a leaf spring, the free end of this member riding on the top of the rail 7 to support the coupler member thereabove. The top of the rail may be provided with a liner 9 and the end of the resilient member may be provided with a shoe 10 to minimize friction and furnish easy replacement for wear. The resilient member is secured to the coupling member by bolts 11.

In operation the leaf spring supports the coupler member in all shifted positions, maintaining a position directly therebeneath as shown in Figure 1. The spring absorbs all necessary vertical movements of the coupler member in all positions.

Figure 2:
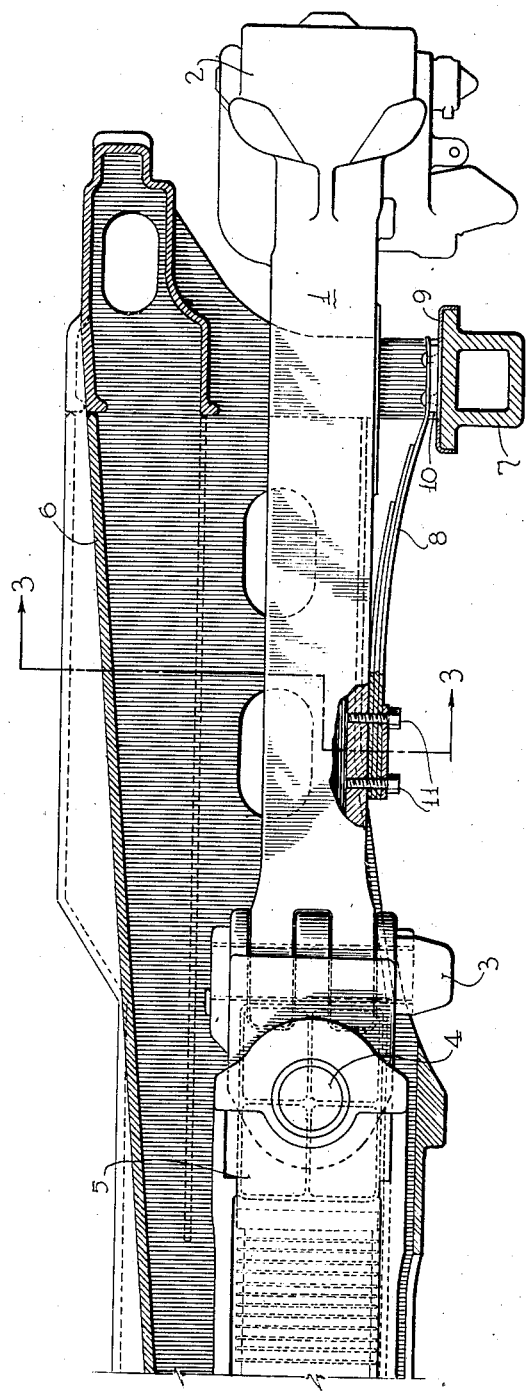
Figure 2 is a vertical longitudinal section.

Figures 4 to 6 show a modification in which a modified form of resilient arm designated generally by 8' is used, this being secured by a pin 12 at its anchored end and riding intermediately against a pin 13. The spring arm is closely embraced on the sides by the depending lugs 14 which carry the pins. Similar parts in Figures 4 to 6 are designated by the same reference characters as in Figures 1 to 3 but with a prime (') added.

It is thus seen that the invention provides simple, durable and quiet means for resiliently supporting a laterally and vertically shiftable coupler member. The resilient supporting member is also long enough to take care of all longitudinal movement of the coupler member against its buffer.

While certain embodiments of the invention have been described it is to be understood that there may be various embodiments within the limits of the prior art and the scope of the subjoined claims.

What is claimed is:

1. Coupling mechanism comprising in combination, a coupler including a shank therefor mounted for vertical and horizontal swinging movements, a coupler carrier extending transversely below the shank of said coupler adjacent its outer end and providing a support for said coupler and its shank, a leaf spring secured through one end thereof to the bottom of said coupler shank at a point inwardly of said carrier and arranged to have its free end bearing slidingly on said carrier and yieldingly holding said coupler and its shank with the latter raised some distance above the carrier at all times in normal use, and longitudinally spaced means arranged inwardly of the free end of said spring and including the spring securing means for maintaining said spring in longitudinal alignment with said shank in the horizontally swinging movements thereof.

2. Coupling mechanism comprising in combination, a coupler including a shank therefor mounted for vertical and horizontal swinging movements, a coupler carrier extending transversely below the shank of said coupler adjacent its outer end and providing a support for said coupler and its shank, a leaf spring secured at one end thereof between spaced depending lugs on the shank, passing between other spaced depending lugs on the shank outwardly removed from said first-named lugs and cooperating therewith to maintain said spring in longitudinal alignment with said shank, and having its free end bearing slidingly on said support and yieldingly holding said coupler and its shank with the latter raised some distance above the carrier at all times during normal use.

WALTER B. DEAN.

REFERENCES CITED

The following references are of record in the file of this patent:

UNITED STATES PATENTS

| Number | Name | Date |
|---|---|---|
| 560,436 | Shaw | May 19, 1896 |
| 1,954,537 | Purcell | Apr. 10, 1934 |
| 1,923,434 | Gilpin | Aug. 22, 1933 |

FOREIGN PATENTS

| Number | Country | Date |
|---|---|---|
| 304,724 | Germany | Apr. 3, 1918 |